United States Patent [19]
Hailey et al.

[11] Patent Number: 5,194,951
[45] Date of Patent: Mar. 16, 1993

[54] SLEEP TIMER ARRANGEMENT FOR A TELEVISION RECEIVER

[75] Inventors: James E. Hailey; John W. Chaney, both of Indianapolis, Ind.

[73] Assignee: Thomson Consumer Electronics, Inc., Indianapolis, Ind.

[21] Appl. No.: 809,711

[22] Filed: Dec. 16, 1991

[51] Int. Cl.⁵ .................. H04N 9/74; H04N 5/44; H04N 3/223
[52] U.S. Cl. ........................... 358/182; 358/22; 358/194.1; 358/180
[58] Field of Search .............. 358/183, 22, 182, 188, 358/194.1, 180, 165

[56] References Cited
U.S. PATENT DOCUMENTS

| | | | |
|---|---|---|---|
| 4,805,022 | 2/1989 | Abt | 358/182 |
| 4,827,344 | 5/1989 | Astle et al. | 358/183 |
| 4,835,613 | 5/1989 | Johnson | 358/183 |
| 4,954,898 | 9/1990 | Nakata | 358/183 |
| 4,959,720 | 9/1990 | Duffield et al. | 358/194.1 |
| 4,979,047 | 12/1990 | Wine | 358/165 |

*Primary Examiner*—John K. Peng
*Assistant Examiner*—John Miller
*Attorney, Agent, or Firm*—Joseph S. Tripoli; Peter M. Emanuel; Thomas F. Lenihan

[57] ABSTRACT

It is desirable that a television receiver provide a prominent visual indication that it is about to automatically turn off. On-screen display (OSD) circuitry automatically reduces the viewable picture area to a small area before turning off the receiver. Reduction of the viewable area may be performed by displaying and gradually enlarging at least one graphically-generated margin of the OSD display.

3 Claims, 5 Drawing Sheets

SLEEP TIMER ARRANGEMENT FOR A TELEVISION RECEIVER

This invention concerns television receivers having an automatic sleep timer function.

BACKGROUND OF THE INVENTION

Many modern television receivers include a so-called sleep timer function for automatically turning the receiver off after a predetermined time interval set by a user. The sleep timer function allows a user to conserve power by shutting off the television receiver automatically if the user has fallen asleep. Such a sleep function is known from, for example, RCA CTC-140 type television receivers manufactured by Thomson Consumer Electronics Incorporated, Indianapolis, Ind.

Unfortunately, even though a user has set a predetermined time for the television to automatically turn off, the user may not fall asleep, but rather may remain awake. If the user does not notice the usually small sleep timer warning message displayed on-screen, the user may forget that the sleep timer is enabled, and then find to his surprise that the television automatically turns itself off.

SUMMARY OF THE INVENTION

It is herein recognized that it is desirable that a television receiver provide a prominent visual indication that it is about to automatically turn off. On-screen display (OSD) circuitry automatically reduces the viewable picture area to a small area before turning off the receiver. Reduction of the viewable area may be performed by displaying and gradually enlarging at least one margin of the OSD display.

DETAILED DESCRIPTION OF THE DRAWING

Figure 1:
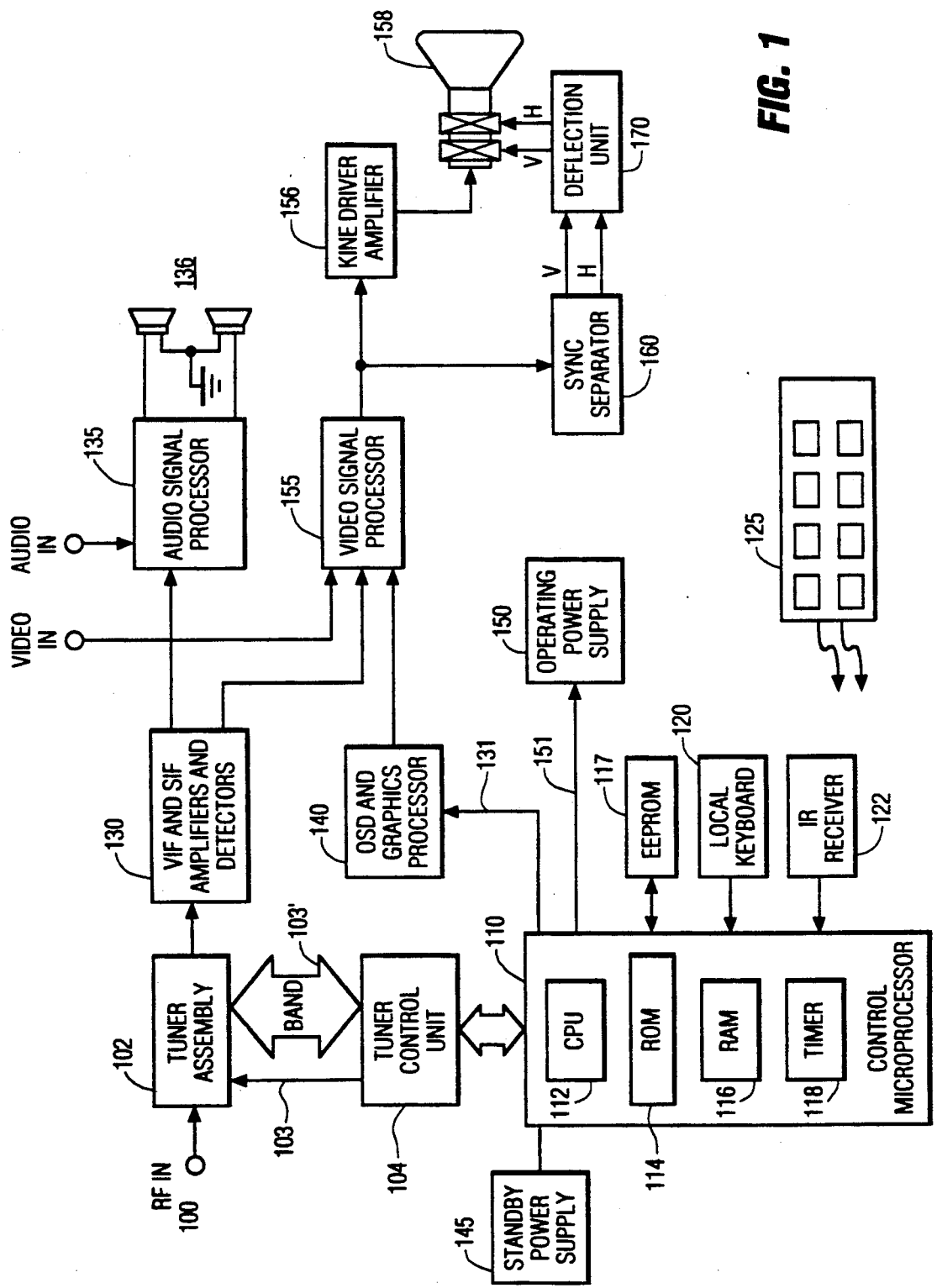
FIG. 1 is a block diagram of a portion of a television receiver suitable for implementing the invention.

Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The other input of video processor unit 155 is connected to an on-screen display and graphics processor circuit 140. The detected audio signal is applied to an audio processor 135 for processing and amplification before being applied to a speaker assembly 136.

Tuner controller 104 generates the tuning voltage and bandswitching signals in response to control signals applied from a system control microcomputer ($\mu$C) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random-access memory (RAM) 116. RAM 116 may be either internal to, or external to, microprocessor 110, and may be of either the volatile or non-volatile type. The term "RAM" is also intended to include electrically-erasable programmable read only memory (EEPROM) 117. One skilled in the art will recognize that if volatile memory is utilized, that it may be desirable to use a suitable form of standby power to preserve its contents when the receiver is turned off.

Microcomputer 110 operates from a source of standby power 145, and controls a source of operating power 150 via a control line 151 for selectively applying power to the remainder of the television receiver. Microcomputer 110 also includes a timer 118 the operation of which will be described below. Microcomputer (or controller) 110 generates a control signal for causing tuner control unit 104 to control tuner 102 to select a particular RF signal, in response to user-entered control signals from local keyboard 120 and from infrared (IR) receiver 122.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processor unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown) Under control of controller 110, an on-screen display processor 140 generates character signals and graphics signals, and applies them to a second input of video signal processor 155, for inclusion in the processed video signal. Electrically-erasable programmable read only memory (EEPROM) 117 is coupled to controller 110, and serves as a non-volatile storage element for storing autoprogramming channel data, and user-entered channel data.

The processed video signal at the output of video signal processor unit 155, is applied to a Kine Driver Amplifier 156 for amplification and then applied to the guns of a color picture tube assembly 158 for display. The processed video signal at the output of video signal processor unit 155, is also applied to a Sync Separator unit 160 for separation of horizontal and vertical drive signals which are in turn applied to a deflection unit 170. The output signals from deflection unit 170 are applied to deflection coils of picture tube assembly 158 for controlling the deflection of its electron beam. The television receiver described thusfar with the exception of OSD and GRAPHICS PROCESSOR 140 is known, for example, from the RCA CTC-140 color television manufactured by Thomson Consumer Electronics, Inc., Indianapolis, Ind.

The invention will now be described with reference to the remainder of FIG. 1, the flow chart of FIG. 2, and the screen displays of FIGS. 3-5.

Preferably, TIMER 118 of FIG. 1 times a fixed predetermined time interval which may be, for example, 30 minutes. Alternatively, a user may enter a predetermined time interval of his own choosing. Remote control unit 125 may include a SLEEP TIMER ON/OFF key or SLEEP TIMER may be a function enabled from an on-screen menu.

Assuming that the timer is enabled, if no sleep timer OFF signal is detected during the 30 minute sleep time interval, the receiver is automatically turned off. If a sleep timer OFF signal is detected during the 30 minute interval, then TIMER 118 is reset and the sleep timer function is deselected. The flowchart of FIG. 2 describes a portion of the control program of controller 110 for accomplishing this function, as well as other functions described below.

Figure 2:
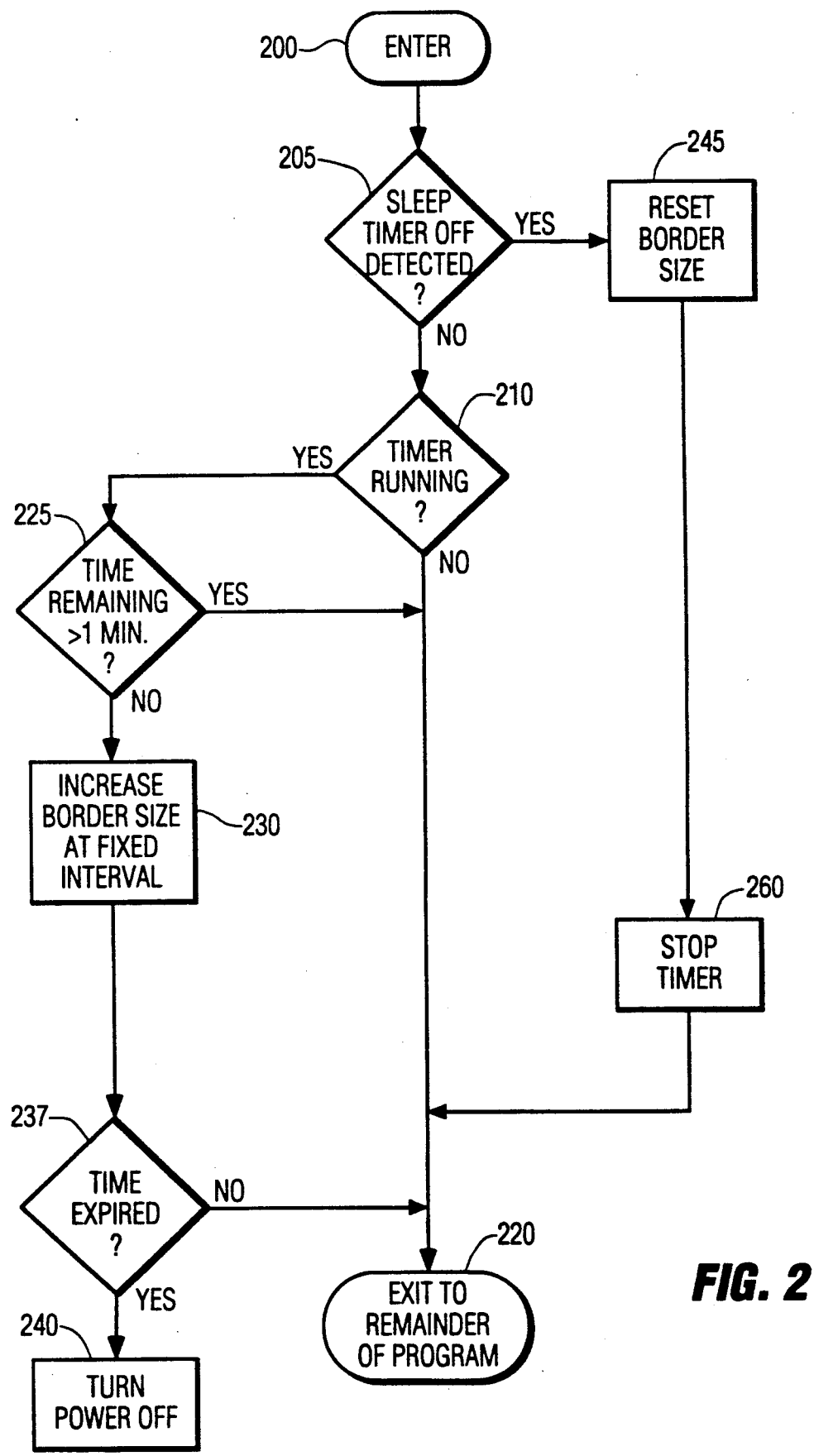
FIG. 2 is a simplified flow chart of a portion of the control program suitable for controlling the microprocessor of FIG. 1.
Figure 3:
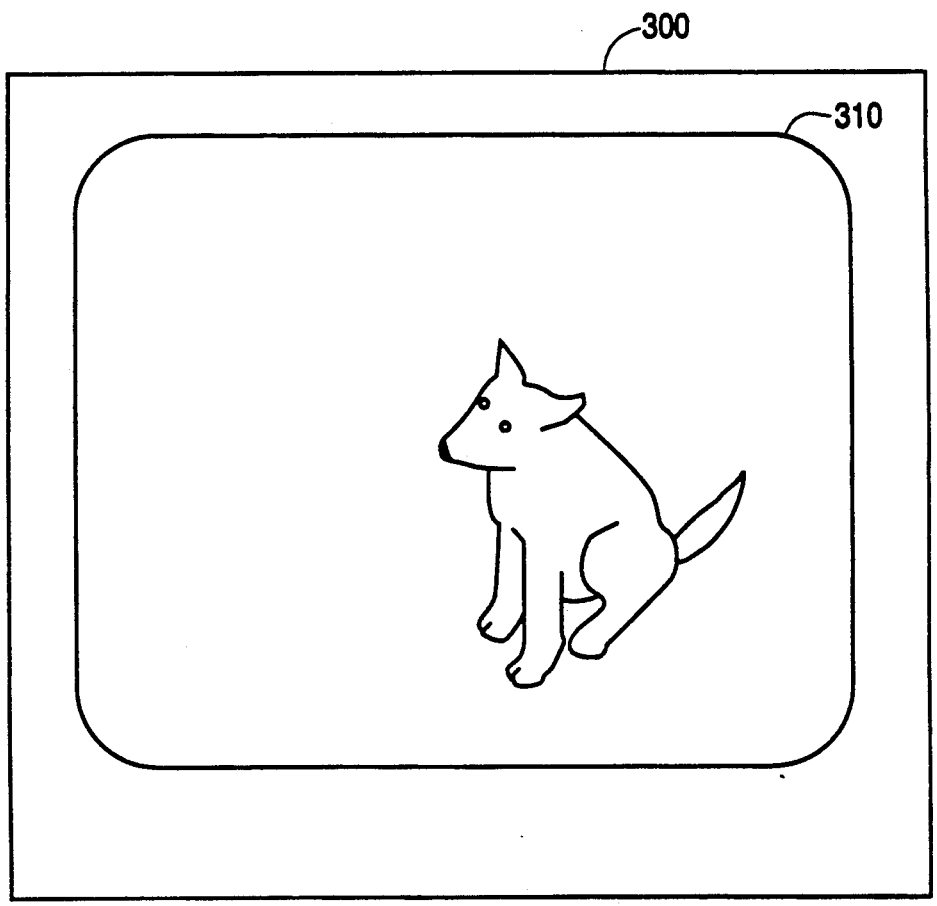
FIGS. 3-5 illustrate various stages of the reduction of the viewable are of the display screen.

The portion of the control program illustrated in FIG. 2 is entered at step 200 from other portions of the control program, such as tuner control and keyboard decoding, which are not pertinent to the subject invention, and therefore need not be explained in detail.

A determination is made at step 205 as to whether or not a SLEEP TIMER OFF signal has been detected. If a SLEEP TIMER OFF signal has been detected, the border size is reset (step 245), the timer is stopped (step 260) and the program is exited (step 220). If a SLEEP TIMER OFF signal has not been detected at step 205, the program advances to step 210 wherein a check is made to see if TIMER 118 is running. If not, the routine is exited at step 220. If it is determined at step 210 that TIMER 118 is running, then a check is made to see if the time interval is near expiration (i.e., one minute or less remaining of the 30 minute sleep time interval) (step 225). If not, the routine is exited. Each time the controller "loops through" this portion of the control program, the controller checks the time remaining in the sleep time interval.

OSD and GRAPHICS PROCESSOR unit 140 of FIG. 1, includes the capability of producing high resolution graphics for display on the screen of picture tube assembly 158, under control of controller 110. Controller 110 communicates with OSD and GRAPHICS PROCESSOR unit 140 via a digital control bus 131. One of the capabilities of OSD and GRAPHICS PROCESSOR unit 140 is the ability to generate graphics margins or borders of various sizes on the screen. FIG. 3 shows a television receiver 300, having a screen 310 showing a video image without borders generated by OSD and GRAPHICS PROCESSOR unit 140, as known from the prior art.

Figure 4:
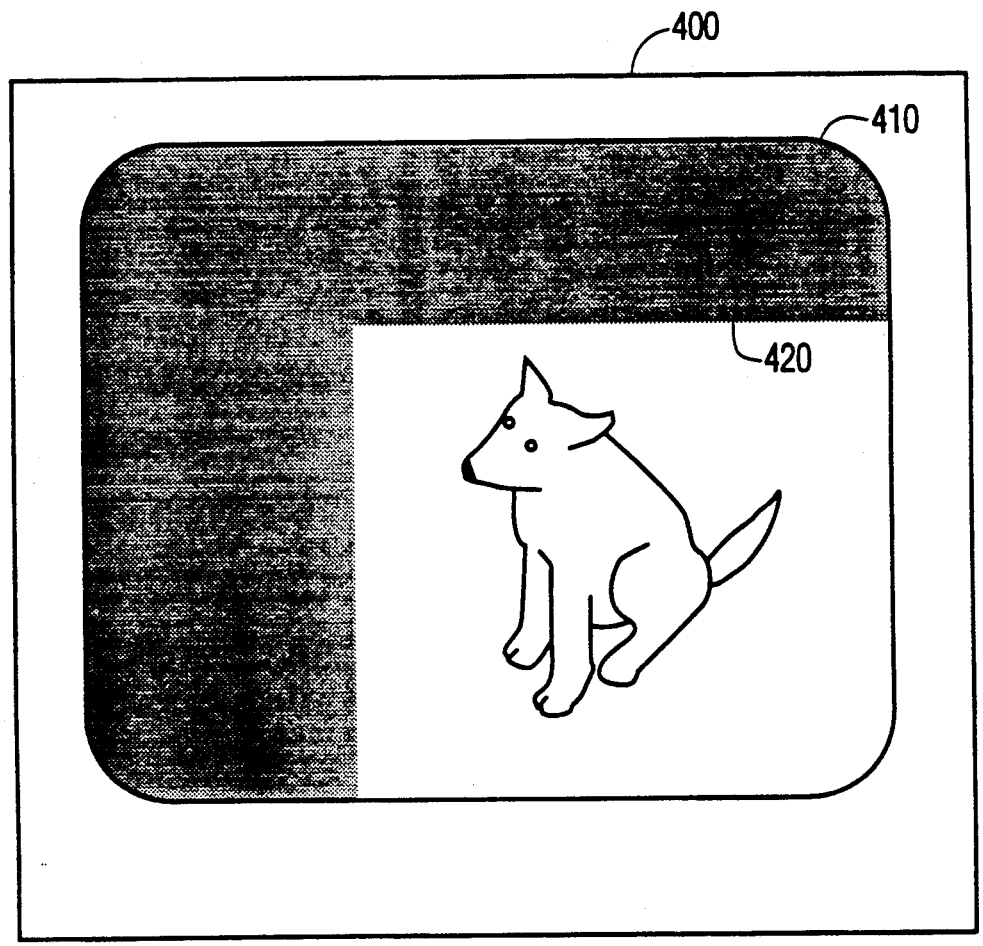
Figure 5:
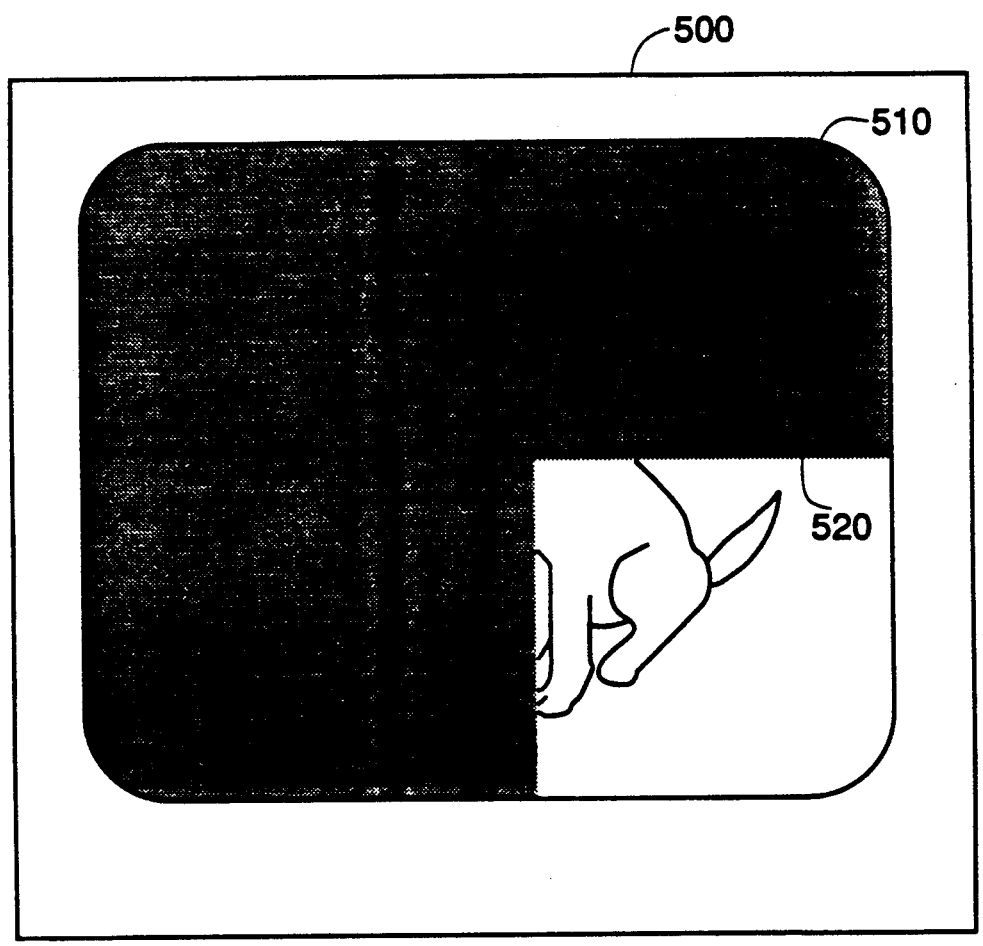

If the time remaining in the sleep time interval is one minute or less (step 225), then controller 110 begins to control OSD and GRAPHICS PROCESSOR unit 140 to display top and left side borders as shown in FIG. 4. During the time in which the sleep time interval is less than two minutes, controller 110 causes OSD and GRAPHICS PROCESSOR unit 140 to increase the area of the borders at a fixed interval (perhaps once every second), which causes the borders to "grow" and to slowly obscure the displayed video image, as shown in FIG. 5. At step 237 the timer is checked to see if the predetermined time interval has expired. If the predetermined time interval has not expired, the routine is exited. If it has expired, the power to the television receiver is turned off (step 240).

It is herein recognized that a video display having gradually increasing borders would serve to warn an awake viewer that the sleep circuitry was about to automatically turn off the receiver, while, at the same time, not disturbing a user who has already fallen asleep. It is also recognized that various patterns of graphics displays other than borders may be used to obscure the video image and thus indicate that TV turn-off is imminent. Some of these patterns include but are not limited to: vertical and horizontal wipes, diamond-shaped wipes, and diagonal wipes.

What is claimed is:

1. Apparatus for automatically removing operating power from a television receiver, comprising:

a source of standby power;

a source of operating power having a control input;

remote control receiver means for receiving a remote control signal modulated with data;

control means coupled to said source of standby power, to said source of operating power, and to said remote control receiver means for decoding said data from said modulated remote control signal;

timer means, coupled to said control means, for timing a predetermined time interval and generating a signal indicative of the expiration of said predetermined time interval;

video signal processing means coupled to said control means, for processing television video signals;

display means coupled to said video signal processing means for displaying said television video signals as a video image; and on-screen display and graphics generator means for producing text character and graphic signals and applying said text character and graphic signals to said video signal processing means for display on said display means in combination with said television video signals; wherein said control means, during a portion of said predetermined time interval, causes said on-screen display and graphics generator means to produce a graphics signal which when displayed on said display means produces a graphics image which obscures a portion of said video image, said control means causing said on-screen display and graphics generator means to gradually increase the size of said graphics image to obscure more of said video image, said timer means, at the expiration of said predetermined time interval, applies said signal indicative of the expiration of said predetermined time interval to said control means, and said control means, in response thereto, causes said source of operating power to cease supplying power to said signal processing means.

2. The apparatus of claim 1 wherein said predetermined time interval is fixed.

3. The apparatus of claim 1 wherein data relating to said predetermined time interval is entered by a user.

* * * * *